United States Patent [19]

Hiramatsu

[11] 4,134,593
[45] Jan. 16, 1979

[54] AUTOMATICALLY OPERATED RECORD PLAYER SYSTEM

[75] Inventor: Katsuzo Hiramatsu, Kooriyama, Japan

[73] Assignee: Mitsubishi Denki Kabushiki Kaisha, Tokyo, Japan

[21] Appl. No.: 735,406

[22] Filed: Oct. 26, 1976

[30] Foreign Application Priority Data

Oct. 23, 1975 [JP] Japan .............................. 50-127617

[51] Int. Cl.² .............................................. G11B 3/60
[52] U.S. Cl. .................................. 274/9 A; 274/39 R; 274/15 R
[58] Field of Search .................... 274/9 A, 9 B, 39 A, 274/39 R, 15 R

[56] References Cited

U.S. PATENT DOCUMENTS

| 2,056,372 | 10/1936 | Schwartz | 274/15 R |
| 2,370,875 | 3/1945 | Pressley | 274/15 R |
| 2,952,464 | 9/1960 | Stimler | 274/15 R |
| 3,179,419 | 4/1965 | Churchill | 274/15 R |
| 3,549,153 | 12/1970 | Atzumi | 274/10 R |
| 3,804,422 | 4/1974 | Kobashi et al. | 274/39 R |
| 3,966,330 | 6/1976 | Ridler et al. | 274/15 R X |

Primary Examiner—Harry N. Haroian

[57] ABSTRACT

A turntable includes nine apertures therethrough arranged in three concentric circles and on three radii of the turntable spaced apart 120° C. Light reflectors are located in the respective apertures and selectively covered with different types of gramophone discs placed on the turntable. During the rotation of the turntable with a gramophone disc the reflectors direct light through the mating apertures to three phototransistors disposed along one radius of the turntable. A logic circuit processes outputs from the phototransistors to set up a rotational speed of the turntable and positions of a tone arm where it is lowered onto and raised from the disc in accordance with a gramophone disc on the turntable. The tone arm is vertically moved by an electric motor through a cam and horizontally swivelled by a reversible electric motor controlled by another logic circuit.

9 Claims, 23 Drawing Figures

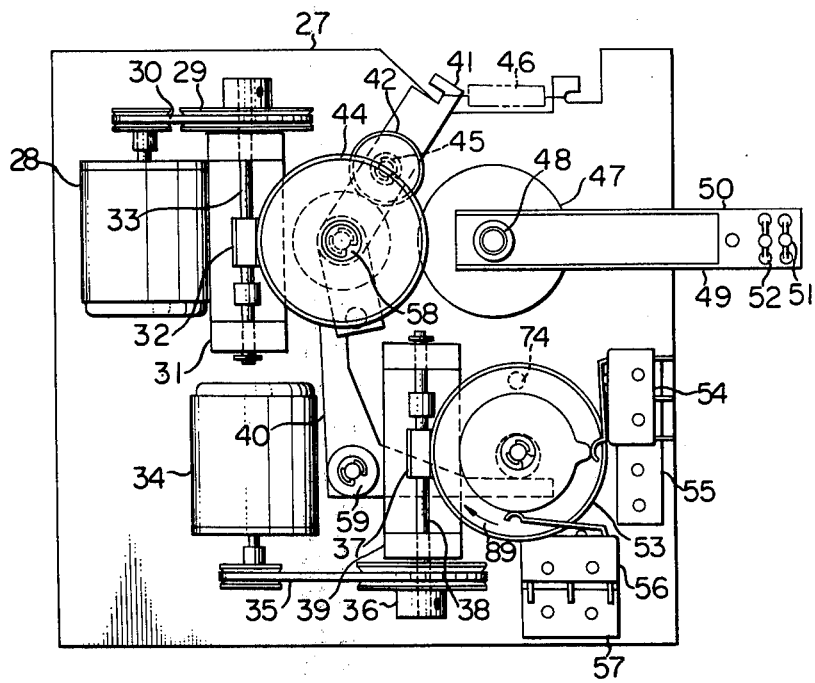
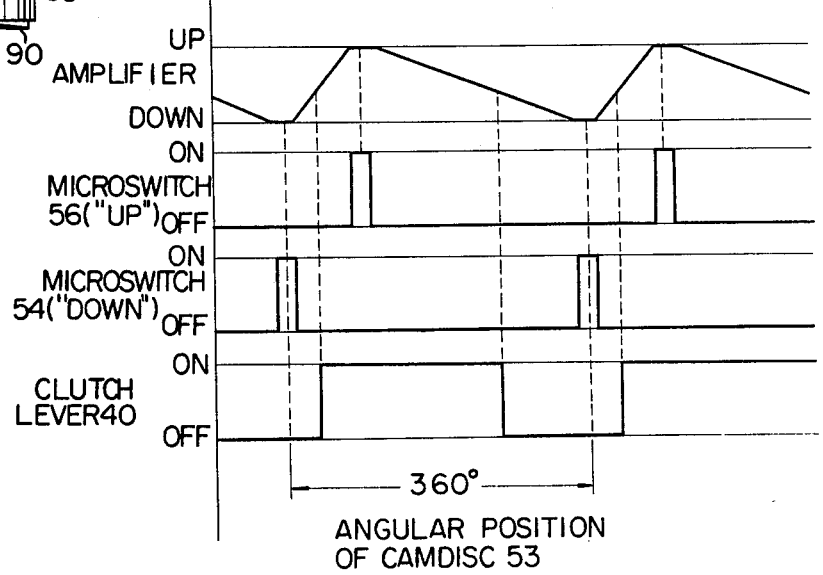

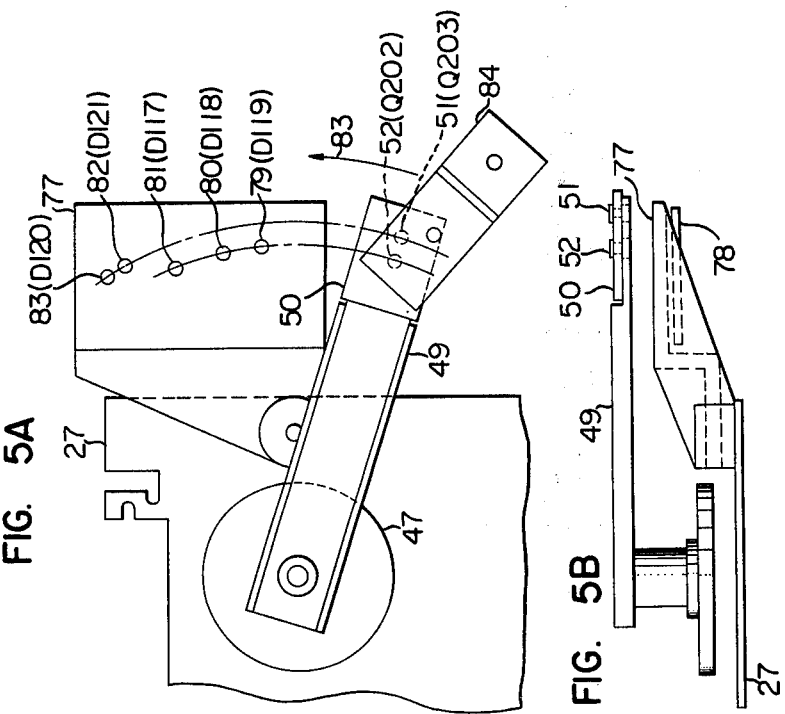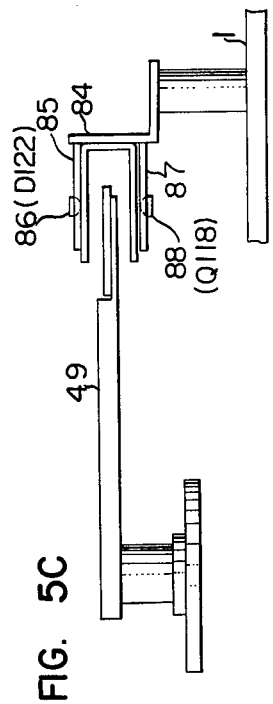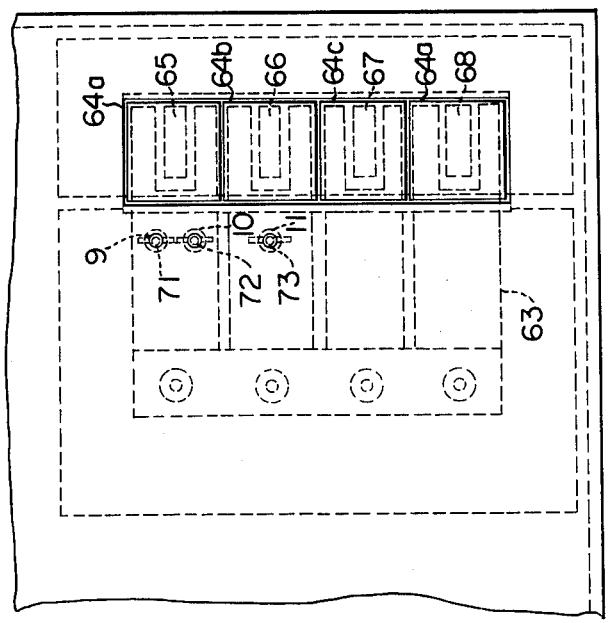

FIG. 7
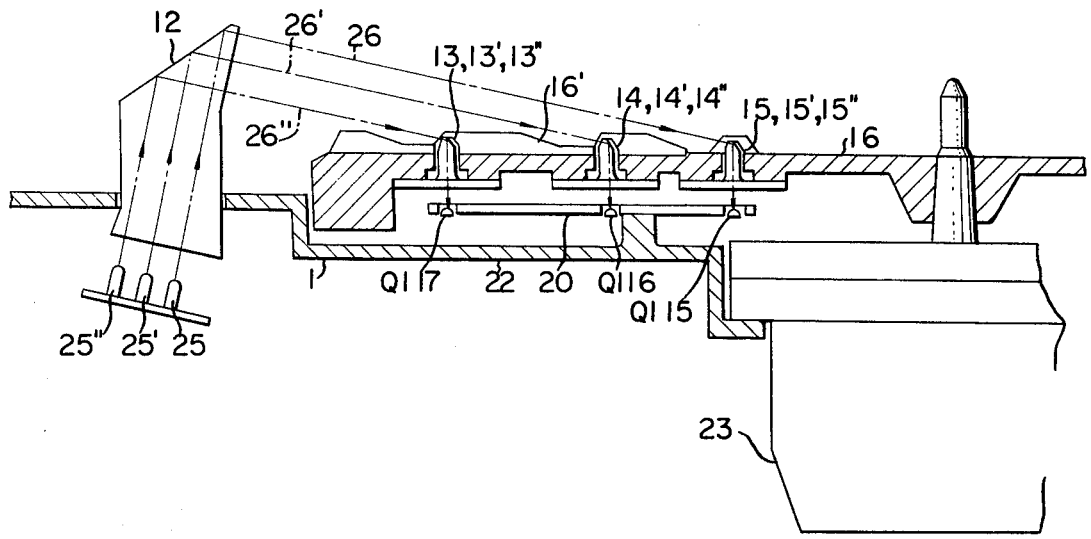
FIG. 8A
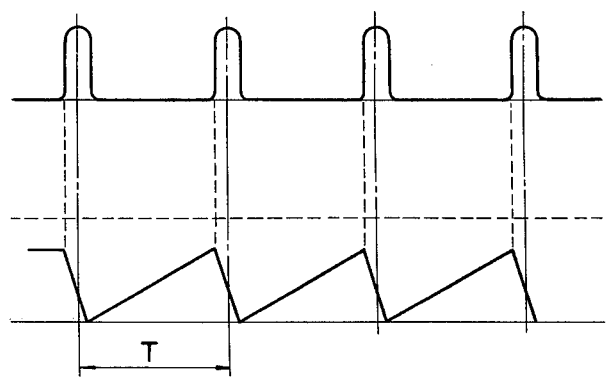
FIG. 8B
| | 30cm DISC | 25cm DISC | 17cm DISC | NO DISC |
|---|---|---|---|---|
| OUTPUT FROM Q102 COLLECTOR | L | L | L | H |
| OUTPUT FROM Q104 COLLECTOR | L | L | H | H |
| OUTPUT FROM Q106 COLLECTOR | L | H | H | H |

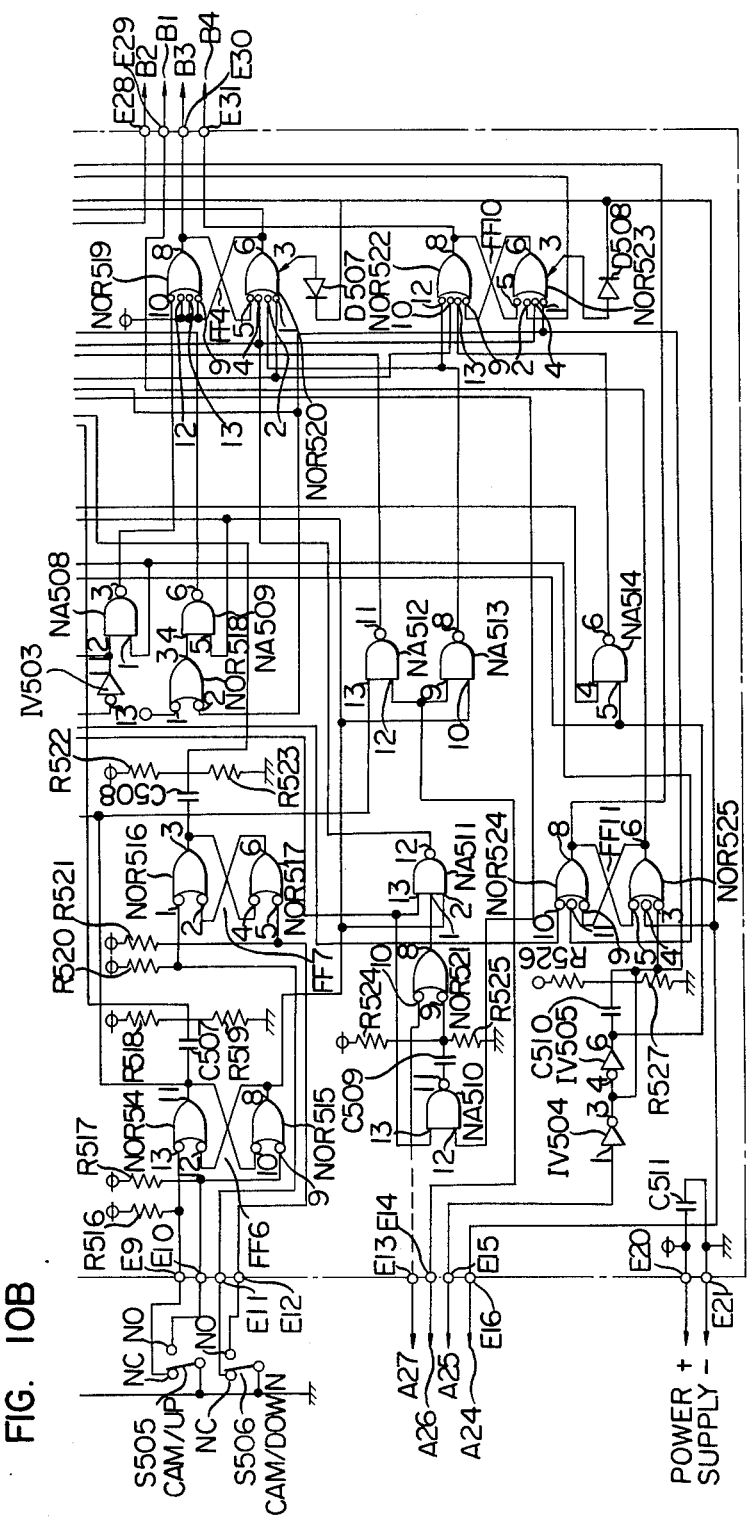

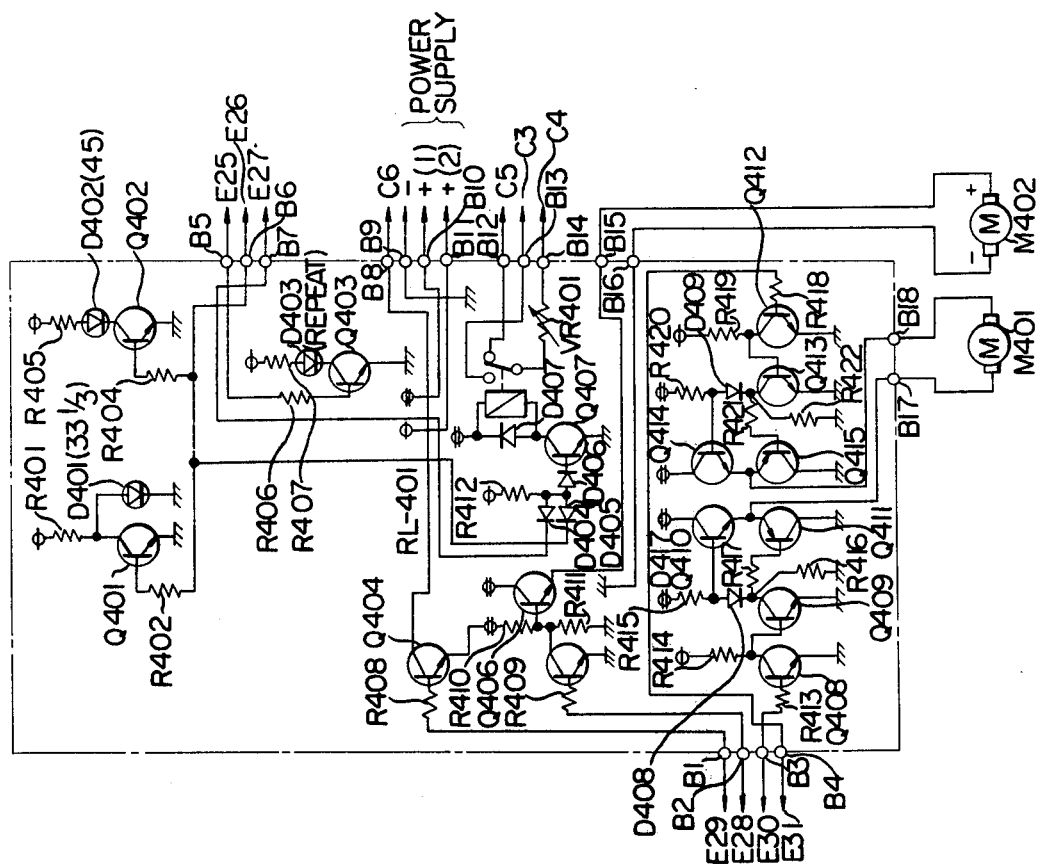
FIG. 12
FIG. 11A
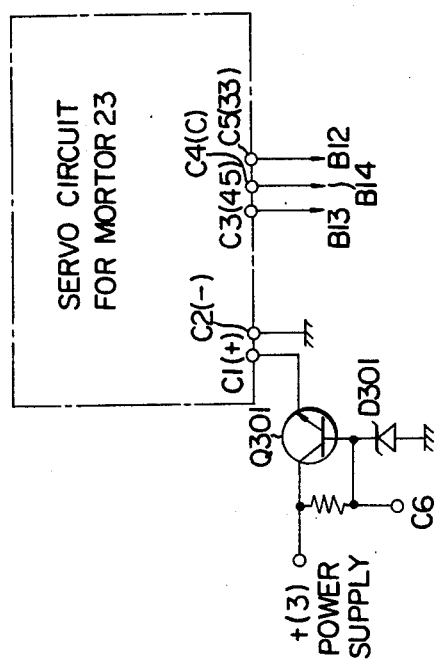
FIG. 11B

AUTOMATICALLY OPERATED RECORD PLAYER SYSTEM

BACKGROUND OF THE INVENTION

This invention relates to improvements in an automatically operated record player system including a tone arm, a turntable etc. controlled by electronic circuits.

Recently, gramophone records or discs themselves and pickup cartridges serving as transducers have been rapidly improved with respect to performance and also the signal-to-noise ratio, performance with respect to irregular rotations etc. have been much improved by the use of electric motors for directly driving the turntable. Under these circumstances high fidelity record player systems have been brought to market one after another. Almost all of such conventional high fidelity record player systems have included a pickup cartridge adapted to be put in its operating position by manually operating an associated tone arm and improvements in their operating capabilities have been few. On the other hand, although automatically operated record player systems laying more or less stress on the operating capability have been brought to market, they have been mechanically controlled resulting in the application of a harmful lateral pressure on the tone arm when it is maintained in its operating position. Thus the users have tended not to accept them as high class record players.

As well known, the reason for which such mechanically controlled record player systems have not yet gained acceptance with the users is that the pickup cartridge used with high class record player systems has included a stylus applying an extremely low pressure to the particular gramophone disc and therefore having a high compliance in on effort to achieve better performance. However, this also comes in question when the users manually operate automatic record player systems. More specifically, mechanical stresses occurring at the needle point of the stylus and on a mating disc are different among different users and on different occasions. Such stresses will never have small values. It would therefore be very desirable to provide an automatically operated record player system causing only small mechanical stresses at a needle point of the stylus thereof and on the associated gramophone disc as compared with the manual operation performed by the user and which always maintains such stresses constant.

SUMMARY OF THE INVENTION

The present invention provides an automatically operated record player system comprising a turntable, a gramophone disc placed on the turntable, size sensor means for sensing the outside diameter of the gramophone disc without contact therewith to produce a control signal, and electronic control means responsive to the control signal from the size sensor means to control the rotational speed of the turntable to a magnitude as predetermined in accordance of the outside diameter of the gramophone disc.

The present invention seeks to provide high fidelity and good operative performance. Accordingly it is an object of the present invention to provide a new and improved automatically operated record player system electronically controlled, high in fidelity and including a mechanism for effecting precise control as compared with mechanical control and still prevent the needle point of a stylus and an associated gramophone disc from being damaged due to any malfunction.

The system of the present invention has the following characteristic features:

1. The outside diameter or size of a gramophone disc is automatically sensed and the position at which the needle point of the stylus moves down onto or leads in to the disc is automatically selected in accordance with the sensed size of disc;

2. The size of the gramophone disc is automatically sensed and the position at which the pickup rises or leads out from the disc is automatically selected after the completion of the playing of the disc;

3. The size of the gramophone disc is automatically sensed and the rotational speed of the disc is automatically selected in accordance with the sensed size of the disc. If the selected rotational speed is not suited to the sensed size of the disc then the rotational speed can be changed at any time by depressing a "SPEED RESET" knob.

4. The depression of a "Start" knob causes the tone arm to be driven so that it is raised from its Rest position and then turned toward the inner periphery of the disc until it goes down onto the disc at its "LEAD-IN" position. Then the tone arm is caused to remain on the disc for the duration of the desired reproduction of sound from the disc.

5. After the playing of the particular disc has been completed, the tone arm is driven so that it is raised from its "LEAD OUT" position and turned toward the outer periphery of the disc until it reaches a "REST" position above its position. Then the tone arm is lowered on the "REST" position. That is the tone arm is returned to its original position occupied before the depression of the "START" knob.

6. A "REPEAT" knob is depressed to bring the system into such a state that the particular disc is repeatedly played. Then the depression of the "START" knob initiates the play of the particular disc in the manner as above described in the feature 4. Upon the completion of that playing, the tone arm is turned toward the outer periphery of the disc as in the feature 5. However, due to the depression of the "REPEAT" knob, the tone arm goes down on the disc at the "LEAD-IN" position in its return course to return to the playing state. The process as above described is repeated until the "REPEAT" knob is released.

7. With the tone arm maintained in the playing state, the operation of a "STOP" knob causes the tone arm to be immediately raised. Then the tone arm is turned toward the outer periphery of the disc until it is returned to its "RESET" position. In this case, even though the "REPEAT" knob is in operation, the tone arm is similarly returned to its "RESET" position while the "REPEAT" knob is released.

8. Upon the initiation of the playing through the depression of the "START" knob, the tone arm can reach its "LEAD-IN" position in the manner as above described for the feature 3 through the depression of the "START" knob immediately followed by its release. However when the "START" knob remains depressed, the tone arm continues to be horizontally turned toward the inner periphery of the disc after it has reached its "LEAD-IN" position without being lowered. If during this horizontal turn, the "Start" knob is released at any position, the tone arm goes down on the disc at that position. That is, it is possible to lower the tone arm onto the disc at any desired position.

9. After the completion of the particular playing or after the operation of the "STOP" knob, the tone arm is raised and horizontally turned toward the outer periphery of the disc. During this turning movement, the "START" knob can be depressed at any desired position immediately followed by its release. This permits the tone arm to again be lowered on the disc at that position. That is, the tone arm while being returned to its "REST" position can be caused to go down on the disc at any desired position.

10. If the "START" knob is depressed without a gramophone disc being present on the turntable then the mechanism for sensing the size of a gramophone disc senses the absence of the disc to prevent the tone arm from going down on the turntable at any position and to turn the tone arm from its "LEAD-IN" position back to its "REST" position.

11. Where the "START" knob has been depressed when a wrong gramophone disc has been placed on the turntable, the "STOP" knob can be depressed when the tone arm has been driven through its rising and horizontally turning movements. This permits the tone arm to be reversely turned from that position where it was when the stop knob was depressed to its "REST" position.

12. When the tone arm is in its "REST" position or in the playing state, the mechanical coupling of the tone arm with a driving mechanism therefor is completely broken. Under these circumstances, manual operation can be always performed. That is, the "REST" status can be changed to the playing state through manual operation and vice versa.

13. The turntable is controlled so as to be rotated whenever playing is required and to be otherwise stopped.

14. Even if either of the "START" and "STOP" knobs are depressed at a time other than when the operation intended to be performed thereby is desired, the associated mechanism remains inoperative thereby preventing the occurrence of a malfunction.

15. The "SPEED RESET" and "REPEAT" knobs can always be operated.

BRIEF DESCRIPTION OF THE DRAWINGS

The present invention will become more readily apparent from the following detailed description taken in conjunction with the accompanying drawings in which:

FIG. 3A is a plan view of a tone arm mechanism used with the present invention;

FIG. 3B is a side elevational view of the components disposed around the U-shaped bearing 39 shown in FIG. 3A;

FIG. 3C is a view similar to FIG. 3B but illustrating the components disposed around the reduction gear 44 shown in FIG. 3A;

FIG. 3D is a view similar to FIG. 3B but illustrating the components disposed around the clutch lever 40 shown in FIG. 3A;

FIG. 4A is a side elevational view of the details of the combined gear and cam disc 53 shown in FIG. 3A;

FIG. 4B is a graph illustrating waveforms useful in explaining the operation of the combined gear and cam disc shown in FIG. 4A;

FIG. 5A is a plan view of the mechanism for sensing the horizontal position of the tone arm shown in FIG. 3A;

FIG. 5B is a side elevational view of the arrangement shown in FIG. 5A;

FIG. 5C is a view similar to FIG. 5B but illustrating the sensor arm in a position different from that shown in FIG. 5C;

FIG. 6A is a fragmental plan view of the operating unit shown in FIG. 1;

FIG. 6B is a side elevational view of the arrangement shown in FIG. 6A;

FIG. 7 is a side elevational view, partly in section of a size sensor mechanism for sensing the outside diameter of a gramophone disc embodying the principles of the present invention;

FIG. 8A is a graph illustrating waveforms developed at two points in a size sensor circuit for gramophone discs shown in FIG. 9;

FIG. 8B is a chart illustrating outputs from the size sensor circuit shown in FIG. 9;

FIGS. 10A and 10B in combination are a diagram of circuits operatively associated with various operating knobs shown in FIGS. 1 and 6A;

FIG. 10C is a diagram illustrating the manner in which FIGS. 10A and 10B are arranged;

FIG. 11A is a schematic diagram of a servo circuit used with an electric motor for driving the turntable and associated components;

FIG. 11B is a truth table for the anti-coincident circuit shown in FIG. 10; and

FIG. 12 is a diagram of circuits operatively associated with electric motors for driving the tone arm.

DESCRIPTION OF THE PREFERRED EMBODIMENT

An automatic record player system constructed in accordance with the principles of the present invention can be generally divided into a pickup unit and a driving mechanism therefor, a turntable and an electric motor unit for directly driving the turntable with a servo circuit therefor, an operation unit, a size sensor unit for sensing the outside diameter of a gramophone disc, a status sensor unit for sensing the status of a tone arm and electronic circuitry. The record player system also comprises supporting structures having attached thereto the abovementioned components and means for coupling the functions thereof to one another. In addition, the system includes a dust cover, a bottom cover, insulators, legs etc. which form no part of the present invention and therefore are not described herein.

Figure 1:
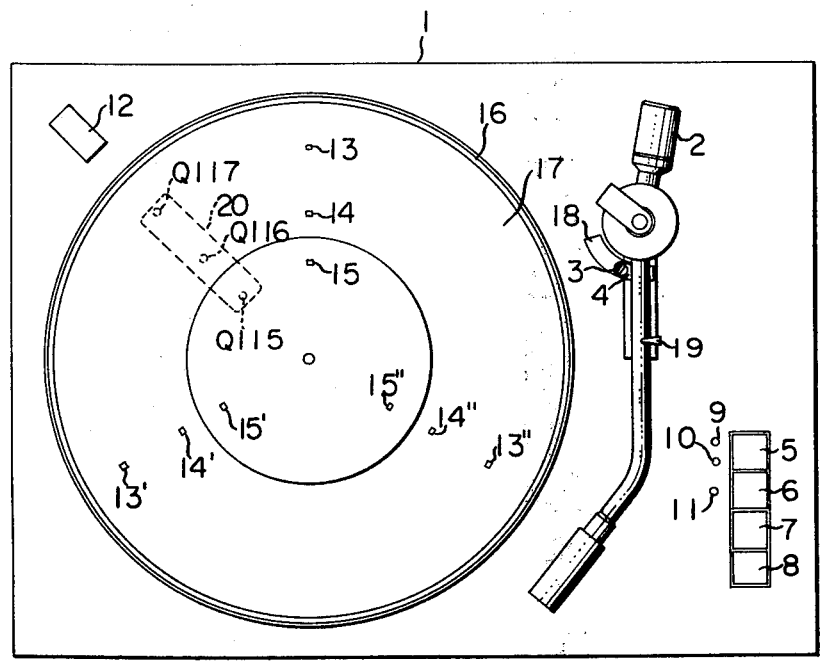
FIG. 1 is a top plan view of an automatically operated record player system constructed in accordance with the principles of the present invention with the cover plate omitted.

Referring now to the drawing and FIG. 1 in particular, there is illustrated various components disposed on an upper surface of an automatic record player system constructed in accordance with the principles of the present invention. The arrangement illustrated comprises a base plate 1, and a tone arm 2 disposed on the base plate 1 in the well known manner and provided at one end with a pickup cartridge of a conventional construction. The tone arm 2 has disposed adjacent to its fulcrum an adjustment screw 3 held in a holder 4 in order to adjust the position of the point on the needle on the pickup cartridge. The tone arm 2 also is operatively associated with an arm holder 19 functioning to temporarily hold the same as required. The arrangement further comprises a series of knobs 5 through 8 disposed near to one corner, in this case, the lower and righthand corner of the base plate 1 and a light reflector 12 disposed at another corner, in this case, the upper and lefthand corner of the base plate 1.

Those knobs are operatively coupled to respective bushbutton switches (not shown) for operating the present player system. More specifically, the knob 5 is called a "SPEED RESET" knob and is to preset the rotational speed of the gramophone disc to be played, and the 6 is called a knob "REPEAT" knob and is to set the manner in which the disc is played. The knob 7 is called a "STOP" knob and is operative to suspend the particular playing and the knob 8 is called a "START" knob and serves to inlate each playing.

The light reflector 12 forms a part of the size sensor unit which is one of the great characteristic features of the present invention and which will be described in detail hereinafter. The reflector 12 serves to reflect light beams from sensing electric lamps (not shown) disposed below the base plate 1, to direct them toward a turntable 16 rotatably disposed above the base plate 1. The reflector 12 is optically coupled to a plurality of other light reflectors disposed on the turntable 16. In the example illustrated, those other reflectors are located in the turntable 16 so that groups of three of them 13, 14 and 15, 13', 14' and 15' or 13", 14" and 15" lie on each of three radii of the turntable 16 positioned at equal angular intervals of 120 degrees and spaced apart predetermined distances from the center of the turntable 16. The light reflectors 13, through 15, 13' through 15' and 13" through 15" have the same construction and receive the light beams reflected from the reflector 12 to reflect them toward an optical detector including three phototransistors Q115, Q116 and Q117 located below the base plate 1 as shown within a dotted rectangle 20 in FIG. 1. The light reflector 12 and the remaining reflectors may be sometimes called hereinafter a type A reflector and type B reflectors respectively. The triad of the type B reflectors 13 through 15, 13' through 15' or 13" through 15" can pass just above the phototransistors Q117, Q116 and Q115 respectively during the rotational movement of the turntable 16.

In FIG. 1 a gramophone disc 17 is shown as being placed on the turntable 16.

Figure 2:
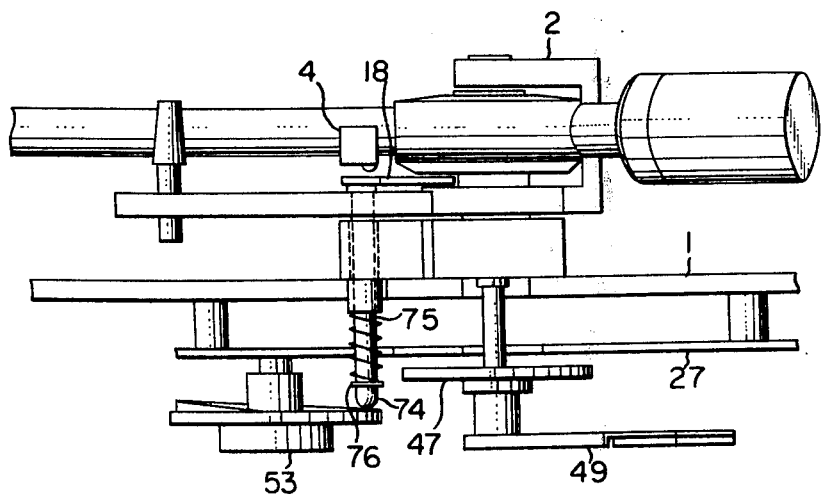
FIG. 2 is a fragmental side elevational view useful in explaining the positional relationship between the tone arm shown in FIG. 1 and a lifter therefor.

Referring now to FIG. 2, the tone arm 2 is secured to the upper surface of the base plate 1 for vertical and horizontal movements and comprises a lifter including a lifter plate 18 (also shown in FIG. 1) and a shaft 74 perpendicularly pendent from the plate and a bearing for the shaft 74. The lifter plate 18 is operative to engage the adjustment screw 3 to vertically move the tone arm. The bearing extends through the base plate 1 and has a free end portion projecting beyond the underside of the base plate 1 and permits the lifter 18–74 to smoothly slide in the vertical direction within the bearing. The shaft 74 includes an E-ring 76 fitted onto that portion thereof near its free end and a compressive spring 75 disposed around the shaft 74 between the abovementioned bearing and the E-ring 76 thereby to tend always to push against a combined gear and cam disc 53.

The gear and cam disc 53 is rotatably mounted on a sub-base plate 27 attached in spaced parallel relationship to the underside as viewed in FIG. 2 of the base plate 1 and includes a first cam portion formed of an interface between the same and the shaft 74. The first cam portion is so shaped that when the cam disc 53 is rotated, it forces the tone arm 2 upwardly through the shaft 74 and the lifter plate 18 by the required distance and it has such a slope that the tone arm effects each cycle including an ascending and a descending stroke during one complete rotation of the gear and cam disc 53.

Referring now to FIG. 3A there is illustrated the entire structure of a driving mechanism for driving the tone arm 2 in both vertical and horizontal directions. The combined gear and cam disc 53 as above described is shown as including a second cam portion disposed on that side thereof toward the viewer and provided with a single radial protrusion as shown in FIG. 3A. During the rotational movement of the cam disc 53 in the direction of the arrow 89 denoted thereon, this protrusion is operative to push against levers on microswitches 54 and 56 to actuate them. The microswitch 54 is operative in response to a "DOWN" position or the lowermost position of the tone arm to sense the "DOWN" position thereof while the microswitch 56 is operative in response to an "UP" position or the uppermost position of the tone arm to sense that position.

The cam disc 53 further includes a third cam portion formed so as to push against one end portion of an L-shaped clutch lever 40 pivotably mounted on a pin 59 through an E-ring 61 so as to be swivelled in a plane parallel to the plate 27 about the axis of the pin 59 mounted on the sub-base plate 27 (see FIG. 3D). The clutch lever 40 has the other end adapted to push against a pin fixedly secured to one end of a lever 41 pivotably secured to the sub-base plate 27 through a pivot pin 58 mounted on the sub-plate 27 (see FIG. 3C). The lever 41 has an idle gear 42 mounted on a pin 45 disposed on one arm thereof to mesh with a smaller diameter portion of a reduction gear 44 rotatably mounted on the pin 58 through an E-ring 60 (see FIG. 3C). Also the lever 41 has the other end in the form of a hook tending to be rotated in the clockwise direction as viewed in FIG. 3A by means of a helical spring 46 anchored at one end to the other end of the lever 41 and at the other end to a suitable portion of the sub-base plate 27.

During the rotational movement of the cam disc 53, that point on the cam disc 53 contacting the lever 40 reaches its position nearest to the center of rotation of the cam disc 53 whereupon the idle gear 42 is contacted by a transmission roller 47 mounted on the shaft for the tone arm (see FIG. 2) to transmit the rotational movement of the reduction gear 44 to that roller 47. On the contrary, when the contact point between the third cam 53 portion and the lever 40 is most remote from the center of rotation of the cam disc 53, the idle gear 42 disengages from the transmission roller 47 to prevent the rotational movement of the reduction gear 44 from being transmitted to the roller 47.

In FIG. 4A the combined gear and cam disc 53 has the three cam portions as above described designated by the reference numerals 90, 91 and 92 respectively, and a gear portion 93. The first cam portion 90 serves to vertically move the lifter 18–74 and the second cam portion 91 serves to actuate the microswitches 54 and 56. The third cam portion 92 acts to actuate the clutch lever 40.

During one complete rotation of the cam disc 53, the lifter 18–74, the microswitches 53 and 56 and the clutch lever 40 are operated with the timed relationship as shown in FIG. 4B. In FIG. 4B four waveforms are illustrated having the abscissas representative of the angular position of the cam disc 53 shown as reading 0 degrees at the DOWN or lowermost position of the lifter (see waveform in the first row of FIG. 4B). As shown by the waveform in the third row of FIG. 4B the "DOWN" microswitch 54 is put in its ON position at and adjacent to the angular position of zero degrees of the cam disc 53 and remains in its OFF position at all other angular positions thereof. Then as the cam disc 53 is rotated, the lifter is raised until it reaches the "UP" or uppermost position. At that time, the "UP" microswitch 56 is put in its ON position. This microswitch remains in its OFF position at all times except at the angular position of the cam disc 53 corresponding to the "UP" position of the lifter and adjacent thereto. The clutch lever 40 is maintained in its ON position only between a point on the ascending stroke and a point on the descending stroke of the lifter as shown by waveform in the lowermost row of FIG. 4B. In the microswitches, the ON position means that its lever is pushed by the second cam 53 portion while the OFF position means that is lever is not pushed by the second cam portion. The clutch lever 40 has its ON position where the associated idle gear 42 is in engagement with the transmission roller 47 and its OFF position where the two are disengaged from each other.

Referring back to FIG. 3A, the gear portion 93 of the cam 53 meshes with a worm gear 37 on form a reduction gearing. As best shown in FIG. 3B, the worm gear 37 is fixedly secured to a shaft 38 supported by a U-shaped bearing 39 disposed on the sub-base plate 27. The shaft 38 has a retaining ring 62 mounted at one end, in this case, the righthand end as viewed in FIG. 3B outside of the U-shaped bearing 39, and a pulley 36 mounted to the other or lefthand end portion outside of the bearing 39. The bearing 39 is provided on the outer bottom surface with a recess through which the clutch lever 40 loosely extends. The pulley 36 is operatively coupled to a reversible electric motor 34 disposed on the sub-base plate 27 by an endless belt 35. Thus the rotational movement of the motor 34 is transmitted to the pulley 36 after a reduction in rotational speed as will readily be understood from the illustration of FIG. 3A. Then it is transmitted to the cam disc 53 through the reduction gearing 37-93.

As above described, the reduction gear 44 can transmit its rotational movement to the transmission roller 47 through the idle gear 42. As shown in FIG. 3A the gear 44 includes a larger diameter gear portion meshing with a worm gear 32 to form a reduction gearing. The worm gear 32 is fixedly mounted on a shaft 32 supported to a U-shaped bearing 31 similar to the U-shaped bearing 39, and disposed on the sub-base plate 27. Then a pulley 20 is mounted on one end portion of the shaft 33 outside of the U-shaped bearing 31 and operatively coupled to a reversible electric motor 28 through an endless belt 30. The motor 28 is also disposed on the sub-base plate 27. As with the motor 34, the rotational movement of the motor 28 is transmitted to the pulley 29 after a reduction in rotational speed. As a result, the reversible motor 28 can horizontally swivel the tone arm 2 toward or away from the center of the turntable as determined by the direction of rotation thereof through the idle gear 42 in engagement with the transmission roller 47 on the shaft for the tone arm.

The status sensor unit or a mechanism for sensing the horizontal position of the tone arm will now be described in conjunction with FIG. 5. FIG. 5A illustrates the positional relationship between a sensor arm 49 attached to the transmission roller 47 mounted on the shaft for the tone arm and indicators for positions "LEAD-IN", "LEAD-OUT" and "REST" position of the tone arm. As shown, the sensor arm 49 is attached at one end to the center of the transmission roller 47 and provided at the other end with a printed circuit board 50 having disposed thereon light receiving elements 51 and 52 such as phototransistors designated by Q202 and Q203 respectively.

A holder 77 for holding indicators or sensors for the "LEAD-IN" and "LEAD-OUT" positions is fixedly secured to the upper portion of the righthand edge of the sub-base plate 27 as shown in FIGS. 5A and 5B. The holder 77 includes a plurality, in this case three, light emitting elements 79, 80 and 81 serving to indicate the "LEAD-IN" positions and a plurality, in this case two, of light emitting elements 82 and 83 serving to indicate the "LEAD-OUT" positions. The light emitting elements 79, 80 and 81 are so positioned that, during the turning movement of the sensor arm 49, they are successively located just above the light receiving element 52 on the sensor arm 49 to form photocouplers therebetween. Similarly, the light emitting elements 82 and 83 are so positioned that, during the turning movement of the sensor arm 49, they are successively located just above the light receiving element 51 on the sensor arm 49 to form photo-couplers therebetween.

The light emitting elements 79, 80, 81, 82, and 83 are light emitting diodes designated by D119, D118, D117, D121 and D120 respectively for a purpose as will be apparent later.

As best shown in FIG. 5C, an L-shaped holder 84 for holding an indicator or a sensor for the "REST" position is disposed on the underside of the base plate 1 by having one leg of the "L" fixed to that underside. The other leg of the L has attached thereto a pair of printed circuit boards 85 and 87 spaced from each other and parallel to each other and to the base plate 1. A light emitting element 86 and a light receiving element 88 are disposed on the printed circuit boards 85 and 87 respectively and are vertically aligned with each other. The elements 86 and 88 are a light emitting diode designated by D122 and a phototransistor designated by Q118 for a purpose as will be apparent later.

With the tone arm at the "REST" position, the sensor arm 49 occupies the position illustrated in FIG. 5C so as to interrupt the optical axis of a photocoupler formed of the light emitting and receiving elements 86 and 88 respectively. This interruption of the optical axis of the photocoupler results in the sensing of the "REST" position.

As the tone arm is turned toward the center of the turntable or a gramophone disc placed thereon, the sensor arm 49 is similarly turned until the light receiving element 52 is located directly above the light emitting element 79. At that time the optical axis of both elements coincide with each other resulting in the sensing of the "LEAD-IN" position. This is true when the element 52 is located directly above each of the elements 80 and 81. It is noted that the light emitting elements 79, 80 and 81 are located at positions where a stylus point on the pickup cartridge comes right above the incoming groove disposed on the outer periphery of gramophone discs 30, 25 and 17 cm in diameter.

When the tone arm is further turned toward the center of the particular gramophone disc, the sensor arm 49 is additionally turned to cause the light receiving element 51 on the sensor arm 49 to come right above the light emitting optical axis of the element 82. Thus the element 51 coincides with that of the element 82 resulting in the sensing of the "LEAD-OUT" position. This is also ture in the case of the light emitting element 83. The light emitting element 82 is located at a position where the stylus point on the pickup cartridge comes directly above an outcoming groove on each of gramophone discs 30 and 25 cm in diameter resulting in the "LEAD-OUT" position being sensed. The light emitting element 83 is similarly positioned to be suited for a gramophone disc having a diameter of 17 cm.

The operation unit shown in the plan view of FIG. 6A and in the side elevational view of FIG. 6B will now be described. Knobs labelled 64a, 64b, 64c and 64d correspond to the knobs 5, 6, 7 and 8 shown in FIG. 1 resspectively. As best shown in FIG. 6B, those knobs are attached to one end of respective leaf springs 63 having the other ends fixedly secured to the underside of the base plate 1 by set screws. A plurality of microswitches 65, 66, 67 and 68 are positioned directly below the respective knobs 64a, 64b, 64c and 64d and attached to a printed circuit board 69 fixedly secured to the underside of the base plate 1. Therefore any one of those knobs can be depressed to actuate the mating microswitch. When released, the knob is returned to its original position by means of the resilience of the mating leaf spring 63 thereby to reset the actuated microswitch by means of its own restoring force.

Three translucent display windows 9, 10, and 11 are disposed adjacent to the knobs 64a and 64b or 5 and 6 as shown in FIG. 6A or 1 on the side toward the tone arm. As best shown in FIG. 6A, light emitting elements 71, 72 and 73 are located directly below the windows 9, 10 and 11 and are attached to a printed circuit board 74 fixed to the underside of the base plate 1. In order to transmit light beams from the light emitting elements 71, 72 and 73 to the display windows 9, 10 and 11 respectively, apertures (not shown) are formed in the associated leaf springs 63 at those positions where lines connecting the windows to the associated elements extend through those leaf springs. The display windows and the light emitting elements form display means for display of the functions performed by depressing the knobs 64a, 64b, 64c and 64d respectively.

The light emitting elements 71, 72 and 73 are designated by D401, D402 and D403 respectively and the microswitches 65, 66 and 67 and 68 are designated by S501, S502, S504 and S503 respectively for a purpose as will be apparent hereinafter.

Referring now to FIG. 7, there is illustrated the entire structure of a size sensor mechanism for automatically sensing the outside diameter or a size of a gramophone disc placed on the turntable in accordance with the principles of the present invention. The arrangement illustrated comprises an electric motor 23 suspended from the base plate 1 to drive the turntable 16 by having the central hole on the turntable 16 fitted onto the motor shaft.

The B type light reflectors 13, 14, 15, 13', 14', 15', 13", 14" and 15" as above described in conjunction with FIG. 1 are disposed within holes extending through the turntable 16 at predetermined positions. In order to protect those reflectors and to prevent a gramophone disc placed on the turntable 16 from slipping, a rubber sheet 16' is disposed on the turntable 16. The rubber sheet 16' includes a plurality of notches disposed at those portions thereof at which the reflectors are to be exposed so as to be capable of receiving light. Light receiving elements Q115, Q116 and Q117 are attached to a printed circuit board 20 at positions directly below the B type reflectors respectively during the rotational movement of the turntable 16. The printed circuit board 20 is fixed to the base plate 1 between the turntable 16 and the base plate 1.

As shown in FIG. 7, the A type reflector 12 is fixedly fitted into an opening disposed outside of the outer periphery of the turntable 16 on the base plate 1 so as to face the center of the turntable 16 and a plurality of electric lamps 25, 25' and 25" are disposed below the base plate 1 and below the opening. A light beam from each of the lamps 25, 25' or 25" is substantially perpendicularly reflected by the reflector 12 to pass along an optical path 26, 26' or 26" reaching each circular array of the B reflectors 15, 15' and 15", 14, 14' and 14" and 13, 13' and 13" during the rotational movement of the turntable 16. The three B type reflectors of each circular array reflect the respective light beams incident thereon in the downward direction until the reflected light beams fall upon the light receiving elements when the B type reflectors are located above those elements during rotation of the turntable. Thus it will be appreciated that each of the light receiving elements are irradiated with pulse-like light thrice during one complete rotation of the turntable 16.

Figure 9:
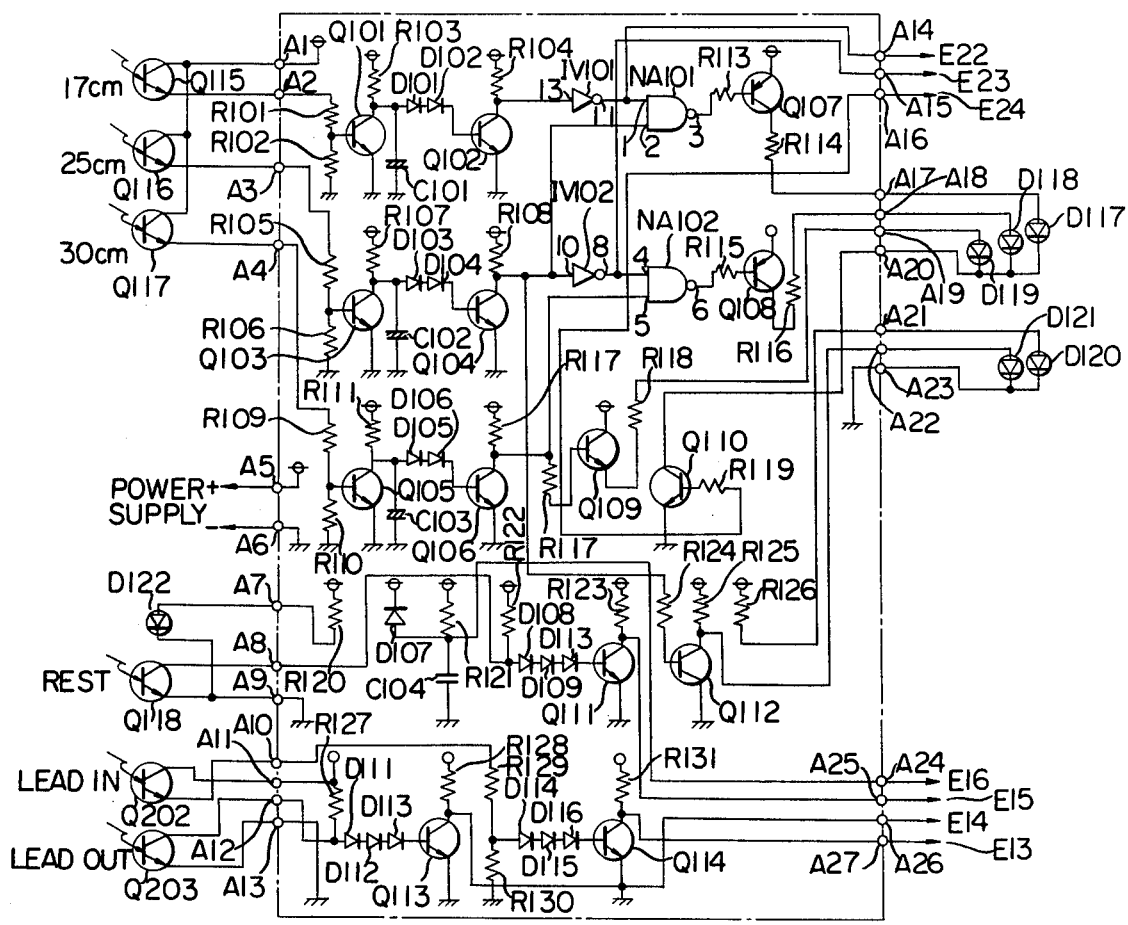
FIG. 9 is a diagram of circuits for sensing the size of a gramophone disc and various positions of the tone arm.

An electronic circuitry as shown in FIG. 9 includes an electronic circuit for electrically processing outputs from the phototransistors serving as the light receiving elements incorporated into the size sensor unit of FIG. 6 and determining the outside diameter or a size of the gramophone disc placed on the turntable 16. More specifically, that electronic circuit comprises, in addition to the phototransistors Q115, Q116 and Q117 for 17, 25 and 30 cm gramophone discs as shown in FIG. 7, a pair of inverters in the form of logic circuits very well known in the art and a pair of "NAND" gates interconnected in the manner as shown in FIG. 9.

The operation of the electronic circuitry will now be described and the details of the circuit configuration will be understood as the description proceeds. Light is intermittently incident upon the phototransistor Q115 to cause a flow of pulsed current through a pair of serially connected resistors R101 and R102 resulting in a variation in voltage developed at the junction of those resistors as shown by the upper waveform in FIG. 8A. That is, the junction has developed thereat a pulse train having a pulse repetition period T equal to one third the time period required for one complete rotation of the turntable. Pulses of the pulse train cause a transistor Q101 to be alternately and repeatedly put in the ON and OFF states. In its ON state, the transistor Q101 permits a charge accumulated on a capacitor C101 to discharge therethrough. With the transistor Q101 in its OFF state, the capacitor C101 is charged through a resistor R103. As a result, the transistor Q101 has a collector voltage as shown by the lower waveform in FIG. 8A.

The transistor Q101 includes a collector connected to a threshold circuit composed of semiconductor diodes D101 and D102, a transistor Q102 and a resistor R104 and having a predetermined constant threshold voltage. The transistor Q102 is responsive to a voltage in excess of the threshold voltage applied thereto so as to be turned on. Assuming that the threshold voltage has a value shown by the horizontal dotted line in FIG. 8A, the resistor R103 and the capacitor C101 are designed to have a time constant such that the sawtoothed waveform shown in FIG. 8A does not exceed the horizontal dotted line shown in the same Figure when light is repeatedly incident upon the phototransistor Q115. Under these circumstances, the transistor Q102 is maintained in its OFF state and has a collector voltage approximating a source voltage. That is, the threshold circuit provides an output maintained at an "H" value.

If light is prevented from falling on the phototransistor Q115 for any reason then the transistor Q101 is maintained in its OFF state. Thus it will readily be understood that the capacitor 101 is charged to a voltage exceeding the threshold voltage to immediately turn the transistor Q102 on. As a result, the transistor Q102 has a collector voltage approximating a ground voltage and provides an output having an "L" value.

A circuit including the phototransistor Q116 resistors R105, R106, R107, R108, R110, transistors Q103, Q104, semiconductor diodes D103, D104, and a capacitor C102 and a circuit including the phototransistor Q117, resistors R109, R110, R111, R112, transistors Q105, Q106, semiconductors D105, D106, and a capacitor C103 are operated in a similar manner to that as above described.

Outputs from the transistors Q102, Q104 and Q106 will now be described with gramophone discs 30, 25 and 17 cm in diameter selectively placed on the turntable 16. For a gramophone disc 30 cm in diameter all the transistors Q102, Q104 and Q106 provide outputs having an "L" value as a result of the disc interrupting light beams reflected from the A type reflector 12 to prevent them from reaching the phototransistors Q115, Q116 and Q117. For gramophone discs 25 cm in diameter, only the phototransistor Q117 disposed in the outermost circle is irradiated with light to provide an output having an "H" value while the remaining transistors Q102, and 104 provide outputs at the "L" value. For a gramophone disc 17 cm in diameter, the transistors Q102, Q104 and Q106 provide outputs having values of "L", "H", and "H" respectively. Also where no gramophone disc is placed on the turntable, all those transistors provide outputs at the "H" value.

The relationship between the outside diameter or size of the gramophone discs and outputs from the transistors Q102, Q104 and Q106 may be collected as shown in the chart of FIG. 8B. It is not difficult to determine the requirements for sensing the size of gramophone discs in view of the chart as shown in FIG. 8B. The requirement that an inverted output from the transistor Q102 and the output from the transistor Q104 should simultaneously have an "H" value is fulfilled only by 17 cm discs. 25 cm discs meet the requirement that an inverted output from the transistor Q104 and an output from the transistor Q106 must simultaneously have an H value. 30 cm discs permit only the transistor Q106 to provide an output having an "L" value and the transistor Q102 alone provides an output having an "H" value in the absence of any disc on the turntable.

Accordingly the transistors Q102, Q104 and Q106 are required only to be connected to the next succeeding circuits to cause the light emitting diodes D117, D118 and D119 (see 81, 80 and 79 in FIG. 5A) to respond to the outputs from those transistors just described. More specifically the collector of the transistor Q102 is connected to an input pin 13 of an inverter IV-101 having an output pin 11 connected to one input pin 1 of a "NAND" gate NA-101. The "NAND" gate NA-101 has the other output pin 2 connected to the collector of the transistor Q104. Similarly, the collector of the transistor Q104 is connected to an input pin 10 of an inverter IV-102 having an output pin 8 connected to one input 4 of an "NAND" gate NA-102 with the other input pin 5 thereof connected to the collector of the transistor Q106.

Therefore with a gramophone disc 17 cm in diameter placed on the turntable and rotated therewith, the output pin 3 of the NAND gate NA-101 has an "L" value which, in turn, turns the transistor Q107 on through a resistor R113. Now assuming that the transistor Q110 is in its ON state, the turn-on of the transistor Q107 permits a current to flow through the light emitting diode D117 (see 81 in FIG. 5A) through a protective resistor R114 to emit light from the diode. Similarly a 25 cm disc causes the turn-on of the transistor Q108 resulting in the light emitting diode D118 (see 80, FIG. 5A) emitting light. Also a 30 cm disc causes an output of an "L" value from the transistor Q106 to turn a transistor Q109 on through a resistor R117 resulting in the emission of light from the light emitting diode D119 (see 79, FIG. 5A).

It is recalled that these light emitting diodes are operative to determine the "LEAD-IN" position of the tone arm in accordance with the size of the particular gramophone disc.

In this way the "LEAD-IN" position has been determined dependent upon a size of the gramophone disc placed on the turntable.

In FIG. 9 a transistor Q112 is shown as being connected to light emitting diodes D120 and D121 designated by 83, and 82 in FIG. 5A. The transistor Q112 includes a base connected to the collector of the transistor Q104 through a resistor R124. As illustrated in FIG. 8B, the transistor Q104 provides an "output L" for a gramophone disc having an outside diameter of 30 or 25 cm and an output "H" for a 17 cm disc. Therefore for 30 and 25 cm gramophone discs, the transistor Q112 is put in its OFF state to cause light to be emitted from the light emitting diode D121 (see 82, FIG. 5A) through a current flowing thereinto via a resistor R125. However any 17 cm disc causes the transistor Q112 to be put in its ON state preventing the light emitting diode D121 from emitting light. On the other hand, the light emitting diode D120 (see 83, FIG. 5A) always has a current flowing therethrough via a resistor R126 so as to emit light.

As above described, the light emitting diode D121 functions to determine the "LEAD-OUT" position for 30 and 25 cm discs while the diode D120 functions to determine the "LEAD-OUT" position for 17 cm discs.

Therefore the process of determining the "LEAD-OUT" position of the tone arm dependent upon the size of gramophone discs can be understood from the foregoing.

A description will now be given of circuits with phototransistors adapted to receive light from the light emitting diodes as above described for the "LEAD-IN" and "LEAD-OUT" positions and a sensor circuit for sensing the "REST" position of the tone arm.

As above described, the phototransistors 52 and 51 (see FIG. 5A) now designated by Q202, and Q203 respectively in FIG. 9 are used to receive light for the "LEAD-IN" and "LEAD-OUT" positions. When light is sensed by the phototransistor Q202, its collector current flows therethrough to develop a voltage drop across a series combination of resistors R129 and R130 connected between its collector and ground. The junction of the two resistors is connected to a threshold circuit including semiconductor diodes D114, D115, D116, a transistor Q114 and a resistor R131 and having a predetermined constant threshold voltage. If the voltage developed across the resistor R130 exceeds this threshold voltage when the transistor Q202 senses light then the transistor Q114 is turned on to produce an output "L" at the collector thereof. This output "L" is connected to a terminal A27.

The phototransistor Q203, has a common emitter configuration, that is, it includes an emitter connected to ground unlike the transistors as above described. When irradiated with light, the phototransistor Q203 is turned on resulting in a collector current flowing through a resistor R127. A corresponding collector voltage approaches the ground voltage. The phototransistor Q203 includes a collector connected to a threshold circuit including semiconductor diodes D111, D112, D113, a transistor Q113 and a resistor R128 and having a predetermined constant threshold voltage. Therefore that threshold circuit is responsive to the sensing of light by the phototransistor Q203 so as to be turned off thereby to produce an output "H" subsequently applied to a terminal A26.

The "REST" sensor circuit is formed of a light emitting diode D122 and a phototransistor Q118 designated by 86 and 88 in FIG. 5C respectively. The diode D122 always has a current flowing therethrough via a resistor R120 so as to emit light that is, in turn, incident upon the phototransistor Q118. The phototransistor Q118 includes a collector connected to a threshold circuit including resistors R122, R123, semiconductor diodes D108, D109, D110 and a transistor Q111 and is identical in both configuration and operation to the threshold circuit connected to the phototransistor Q203. Accordingly, with the tone arm put in its position "REST" position, the sensor arm 49 (see FIG. 5) interrupts an optical path extending from the light emitting diode D122 to the phototransistor Q118 with the result that the output from the transistor Q111 has an "L" value.

When the tone arm is in a position other than the "REST" position, the transistor Q111 provides an output having an "H" value. This output is connected to a terminal A25.

In FIG. 9 a time constant circuit is further shown as including a resistor R121 connected to ground through a capacitor C104 with the junction of two connected to a terminal A24, and also to a semiconductor diode D107. This time constant circuit is operative to lead a voltage from the junction to ground immediately after the connection to an electric source whereby the circuit generates a power reset signal in order to reset "FLIP-FLOP" circuits as will be described later. After the source is brought into its OFF state, the diode D107 immediately causes the capacitor C104 to discharge to be ready for the next connection to the source.

Figure 10A:
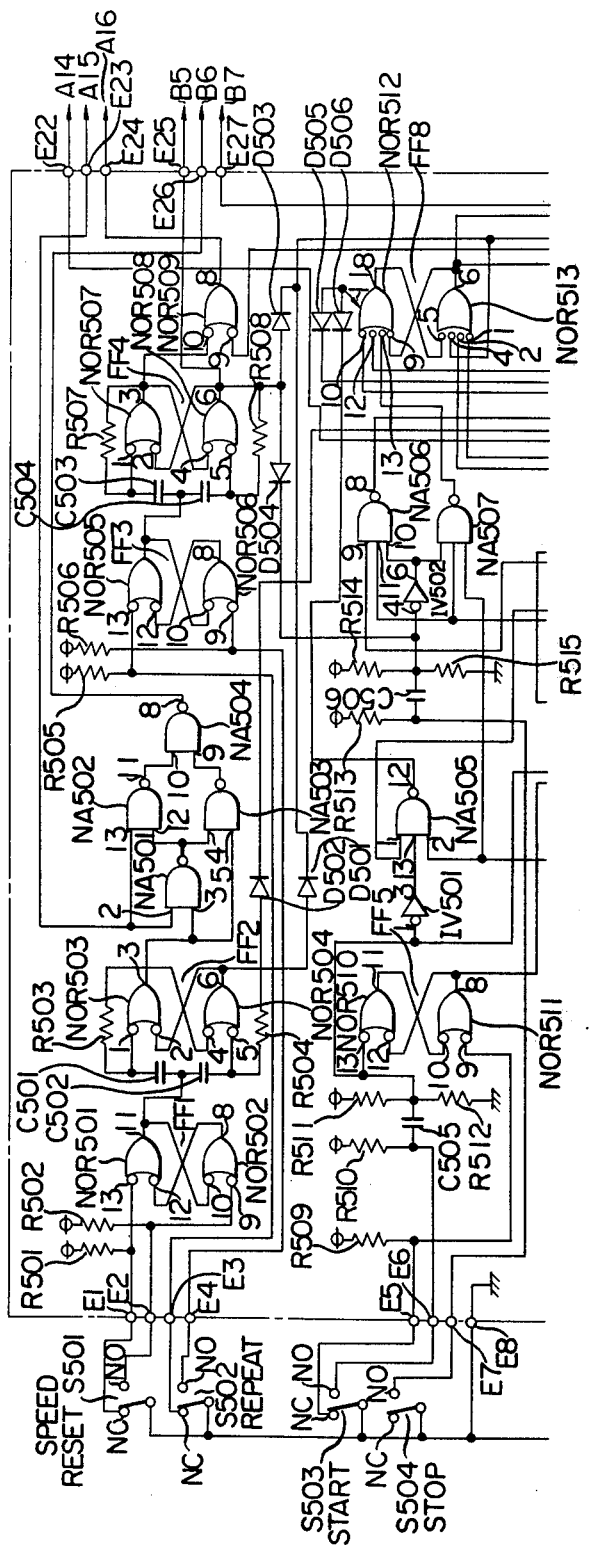

The terminals A24 through A27 are connected to terminals E13 through E16 shown in FIG. 10, respectively.

The overall operation of the present invention will now be described in conjunction FIGS. 9, 10, 11 and 12. After a selected gramophone disc has been placed on the turntable 16 and the tone arm is put at the "REST", position the "START" knob is depressed to actuate the microswitch 68 (FIG. 6A) or S503. In FIG. 10, the microswitch S503 is connected at its contact NO to ground through a resistor R510 and therefore it forms a negative trigger signal through differentiation by a capacitor C505, and resistors R511 and R512. This negative trigger signal is applied to an input pin 10 of a FLIP-FLOP circuit FF11 including "NOR" gates NOR 524 and NOR 525. The FLIP-FLOP circuit FF11 is originally placed in its reset state by having its input pin 4 preliminarily supplied with a power reset signal as above described in conjunction with FIG. 9. Thus the circuit provides an output "H" at the output pin 6. When applied the negative trigger signal is applied thereto, the FLIP-FLOP circuit FF11 is triggered to its set state to provide an output "L" from the output pin 6, that is connected by a terminal E29 to a terminal B1 shown in FIG. 12. In FIG. 12, a transistor Q404 connected to the terminal B1 through a resistor R408 is turned off by that output "L". The transistor Q404 includes a collector connected by a terminal B8 to a terminal C6 shown in FIG. 11A. In FIG. 11A, a transistor Q301 coupled to the terminal C6 is turned on. The transistor Q301 then supplies to a motor servo circuit (which is schematically shown in block form in FIG. 11a for the electric motor for driving the turntable, a voltage as determined by a Zener diode D301 and the resistor R301. Thus the turntable is started to be rotated.

After the turntable has been started to be driven, the size sensor circuit is operated to determine the rotational speed of the turntable. The process of determining the rotational speed of the turntable will now be described by the operation of the "SPEED RESET" knob.

As shown in FIG. 10, the microswitch S501 (see 65, FIG. 6A) for the "SPEED RESET" knob included in a speed reset circuit has a pair of contacts NC and NO connected to a source + B through respective resistors R501 and R502 and also to one input pin 13 and one input pin 9 respectively of "NOR" gates NOR 501 and NOR502 forming a FLIP-FLOP circuit FF1. By depressing and then releasing the knob for the microswitch S501, the FLIP-FLOP circuit FF1 is caused to produce one signal "L" from its output pin 11. The "L" signal is supplied to a T type FLIP-FLOP circuit FF2 formed of "NOR" gates NOR503, NOR504, capacitors C501, C502 and resistors R503, R504. The T type FLIP-FLOP circuit FF2 includes a pair of output pins 3 and 6. An output at the output pin 3 is changed from its "H" through its "L" to its "H" value each time the knob for the microswitch S501 is depressed once. The output from the output pin 3 is applied to an anti-coincident circuit formed of NAND gates NA501, NA502, NA503 and NA504 and including a pair of input pins 2 and 1 and an output pin 8. The anti-coincident circuit is operative as shown in a truth table as shown in FIG. 11B.

From the truth table of FIG. 11B it is seen that the anti-coincident circuit provides an output "L" with both inputs thereof simultaneously have an "H" or "L" value and an output "H" when both inputs are different in value from each other.

The "NAND" gate NA-501 has one input pin 1 connected to the output pin 3 of the T type FLIP-FLOP FF2 and the other input pin 2 connected to the output pin 8 of the inverter IV-102 shown in FIG. 9 through a terminal E23. Assuming that a 30 cm disc is placed on the turntable and rotated therewith, the size sensor circuit produces an output "L" from the collector of the transistor Q104 (see FIG. 9) as shown in FIG. 8B. Therefore the output pin 8 of the inverter IV 102 has an "H" value. On the other hand, the FLIP-FLOP circuit FF2 has the output pin 3 maintained at an "H" value. This is because the time constant circuit as shown in FIG. 9 has supplied a power reset signal to the pin 6 of the FLIP-FLOP circuit FF2 through a terminal E16 and a semiconductor diode D501 upon the connection to the source.

Therefore, from the truth table of FIG. 11B it is seen that the anti-coincident circuit provides an output "L". This output "L" is connected via a terminal E26 to a terminal B6 shown in FIG. 12. In FIG. 12, the output "L" from the anti-coincident circuit is entered into a two-input "NAND" gate composed of semiconductor diodes D404, D405, D406, a resistor R412 and a transistor Q407. That circuit has the other input supplied with an input signal maintained at an "H" value during the rotational movement of the turntable as will be described hereinafter. Accordingly, the transistor Q407 is turned off and a relay RL401 connected to the collector thereof is not actuated because no current flows through the operating winding thereof.

The relay RL401 includes a pair of stationary contacts connected by terminals B12 and B13 to respective terminals C5 (for 33⅓ rpm) and C3 (for 45 rpm) of the servo circuit for the motor for driving the turntable as shown in FIG. 11A and a movable arm connected via a terminal B14 to a terminal C4 of the same servo circuit. The terminal C5 or C3 delivers a signal indicating that the driving motor is rotated at 33⅓ or 45 rpm respectively. In order to finely adjust the rotational speed of the motor for driving the turntable a variable resistor VR401 is connected to the movable arm of the relay RL401.

When the relay RL401 not actuated as above described, the motor is being rotated at 33⅓ rpm. The output "L" at the terminal E26 or B6 is applied to the base of a transistor Q401 through a resistor R402 to turn the transistor off. The turning off of the transistor Q401 causes a flow of current through the light emitting diode D401 (which is designated by 71 in FIG. 6). Thus the diode D401 emits light to indicate that the motor and therefore a gramophone disc on the turntable is rotating at 33⅓ rpm as will readily be understood from the description given in conjunction with FIG. 6.

When a 25 cm disc is to be played, the process as above described is repeated.

For a 17 cm disc, the size sensor circuit provides an output "L" that is applied to the atni-coincident circuit and therefore the input pin 2 of the "NAND" gate NA501. Thus an output "H" appears at the output pin 8 of the NAND gate NA504. As a result, the transistor Q407 (see FIG. 12) is turned on to operate the relay RL401. This results in the change of the rotational speed to 45 rpm and simultaneously the light emitting diode D402 (see 72, FIG. 6) emits light.

From the foregoing it will be appreciated that the record player system of the present invention automatically sets the rotational speed of the particular gramophone disc in accordance with a size or an outside diameter thereof.

As is well known, some 17 cm gramophone discs are required to be played at 33⅓ rpm. This leads to the necessity of resetting the rotational speed of the disc. To this end, the operating "SPEED RESET" microswitch S501 can be depressed to trigger the output from the FLIP-FLOP circuit FF2 including the "NOR" gates NOR503 and NOR504 from an "H" to an "L" value. Therefore the anti-coincident circuit has the pair of inputs put at the "L" value and provides an output "L". This results in the change of the relay RL401 to the rotational speed of 33⅓ rpm and causes the diode D401 to indicate 33⅓ rpm. Also for 30 and 25 cm discs, the rotational speed may be changed from 33⅓ rpm to 45 rpm by repeating the process as above described.

The negative trigger signal generated by depressing the knob "START" S503 (FIG. 10) is inverted to a positive trigger signal by an inverter IV501. The positive trigger signal is applied to an input pin 13 of a "NAND" gate NA505 having another input pin 1 connected to an output pin 3 of an inverter IV504 having an input pin 1 connected via a terminal E15 to a terminal A25 shown in FIG. 9. The terminal A25 has a reset signal applied thereto from the time constant circuit as above described in conjunction with FIG. 9. It is recalled that this reset signal has an "L" value because the tone arm is set at its "REST" position upon the operation of the "START" knob. Thus the inverter IV504 provides an output "H" at the output pin 3 and the input pin 1 of a "NAND" gate NA505 has an "H" value. The NAND gate NA505 includes a third pin 2 connected to an output pin 1 of a FLIP-FLOP circuit FF6 formed of NOR gates NOR514 and NOR515.

The FLIP-FLOP circuit FF6 is adapted to be controlled by the microswitch S505 (see 56 FIG. 3A) for sensing the "UP" position of the tone arm. Upon operating the "START" knob, the tone arm is in its "DOWN" position and the microswitch S505 has the movable arm thereof engaging the stationary contact NC as shown in FIG. 10. With the microswitch S505 in the position illustrated in FIG. 10, the FLIP-FLOP circuit FF6 provides an output "H" at its output pin 11. Therefore the positive trigger signal applied to the pin 13 of the "NAND" gate NA-505 can pass through that gate to develop a negative trigger signal at an output pin 12 thereof. In other words, the "NAND" gate NA505 functions as a gate permitting a "START" signal to pass therethrough only when the tone arm is at its "REST" position and not yet in its "UP" position.

The negative trigger signal leaving the output pin 12 of the "NAND" gate NA505 is applied via a semiconductor diode D506 to a FLIP-FLOP circuit FF8 formed of "NOR" gates NOR512 and NOR513. That FLIP-FLOP circuit FF8 has been preliminarily reset so as to provide an output "H" at the output pin 6 thereof. However by applying the negative trigger signal to the FLIP-FLOP circuit FF8, the output "H" at the output pin 6 thereof is inverted to an output "L". This output "L" is connected via a terminal E28 to a terminal B2 shown in FIG. 12. In FIG. 12, the output "L" is applied to a transistor Q405 through a resistor R409 to turn it off while turning a transistor Q406 on. Then the now conducting transistor Q406 supplies a voltage as determined by resistors R410 and R411 to the vertical drive electric motor 11 402 designated by 34 in FIG. 3A to rotate the motor.

The motor M402 is rotated to raise the tone arm until the "UP" microswitch S505 designated by 56 in FIG. 3A is thrown toward its stationary contact NO to connect the input pin 9 of the FLIP-FLOP circuit FF6 to ground. Thus that FLIP-FLOP circuit provides a signal "L" at its output pin 11. Then the signal "L" is differentiated by a capacitor C507 and resistors R518 and R519 to form a negative trigger signal that is, in turn, applied to the input pin 2 of the FLIP-FLOP circuit FF8. Thus the output pin 8 of the FLIP-FLOP circuit FF8 is inverted to an "H" value. Therefore, in FIG. 12, the transistor Q405 is turned on and then the transistor Q406 is turned off resulting in the stoppage of the vertical drive motor M402.

The negative trigger signal is also applied to an inverter IV503 so that the polarity is inverted. The inverted signal is applied to both one input pin 2 of a "NAND" gate NA508 and one input pin 4 of a NAND gate NA514. The NAND gate NA508 includes the other input pin 1 connected to an output pin 3 of an inverter IV504 included in the "REST" position signal circuit as above described while the other input pin 5 of the "NAND" gate NA514 is connected to an output pin 6 of another inverter IV505. Under these circumstances, whether or not the tone arm is in its "REST" position determines which NAND gate passes the inverted or positive trigger signal.

Since the rise of the tone arm has been completed, it is at its "REST" position. Therefore the positive trigger signal is permitted to pass through the "NAND" gate NA508 whereby the signal become negative. This negative trigger signal is applied to an input pin 10 of a FLIP-FLOP circuit FF9 formed of "NOR" gates NOR519 and NOR520. That FLIP-FLOP circuit FF9 has been preliminarily set by the power reset signal to provide an output "H" at its output pin 6 and an output "L" at its output pin 8 but the application of the negative trigger signal thereto causes those outputs to be inverted in polarity. That is, the output pin 8 provides an output "H". The output "H" from the output pin 8 is delivered via a terminal E30 to a terminal B3 shown in FIG. 12. In FIG. 12, a transistor Q408 connected to the terminal B3 through a resistor R413 is turned on while a transistor Q409 is turned off. Therefore transistors Q411 and Q410 are turned off and on respectively. The now conducting transistor Q410 supplies a voltage as determined by resistors R415 and R416 to a horizontal drive electric motor M401 through one terminal B17 for the motor. The motor is designated by 28 in FIG. 3A and operative to horizontally turn the tone arm. At that time, the other terminal B18 for the motor is maintained at a ground voltage because the transistor Q412 is in its OFF state and both transistors Q413 and Q415 are in their ON state. Accordingly the motor M401 is rotated in such a direction that the tone arm is turned toward the center of a gramophone disc placed on the rotating turntable.

Referring back to FIG. 10, the output pin 6 of the FLIP-FLOP circuit FF9 is inverted from an "L" to an "H" value upon the output pin 8 thereof being inverted from an "L" to an "H" value. The signal thus inverted is applied to a NOR gate NOR509 to put its output pin 8 at an "H" value. The output "H" from the output pin 8 enters a terminal A16 (see FIG. 9) through a terminal E24. In FIG. 9 a transistor Q110 is turned on through a resistor R119. At that time the tone arm is started to be horizontally turned while at the same time, the light emitting diode for "LEAD-IN" corresponding to a sensed size of the particular gramophone disc emits light.

As a result, the tone arm is horizontally turned toward the inner periphery of the disc until it reaches its position above the outer periphery at the disc. At that time, the "LEAD-IN" sensing circuit as above described is completed resulting in the appearance of a signal "L" at a terminal E13 shown in FIG. 10. This signal "L" is applied to one input pin 9 of a "NOR" circuit NOR512 to provide an output "H" at its output pin 8 regardless of the status of the signal present at the other input pin 9 thereof. The output "H" from the output pin 8 is applied to an input pin 1 of a "NAND" gate NA511. The NAND gate NA511 is adapted to provide an output in response to values of the following two signals. The first one of the signals is a signal applied to another input pin 13 of the NAND gate NA511 and resulting from an output pin 8 of a FLIP-FLOP circuit FF5 including "NOR" gates NOR510 and NOR511. The FLIP-FLOP circuit FF5 is connected so as to provide an output "L" at an output pin 8 thereof as long as the "START" microswitch S503 designated by 66 in FIG. 6A is in its depressed position. While the tone arm is moved toward its LEAD-IN position, the output pin 8 of the FLIP-FLOP circuit FF5 is maintained at an "H" value because the "START" knob has not yet been operated. The second signal is what is applied to still another input pin 2 of the "NAND" gate NA511 and resulting from the output pin 8 of a FLIP-FLOP circuit FF6. Since the tone arm effects the horizontal turning movement while being held in its "UP" position, the microswitch S505 remains thrown toward the NO contact and the output pin 8 of the FLIP-FLOP circuit FF6 provides, as a matter of course, an output "H".

From the foregoing it will be appreciated that the output or the positive trigger signal from the "NOR" gate NOR521 passes through the "NAND" gate NA-511 to be inverted to a negative trigger signal. The negative trigger signal is delivered to the input pin 4 of the FLIP-FLOP circuit FF9 to impart an "L" value to its output pin 8 thereby to stop the rotational movement of the motor M401. At the same time a FLIP-FLOP circuit 8 is triggered through a semiconductor diode D505 to impart an "L" value to its output pin 6. Consequently the process as above described is repeated to rotate the vertical drive motor M402 in the downward direction due to the cam effect rather than in the upward direction as above described. In other words, a LEAD-IN signal is provided to stop the horizontal turning movement of the tone arm and to initiate the descent thereof. The tone arm continues to descend until the stylus point thereon reaches the gramophone disc on the turntable. Soon thereafter the microswitch S506 for sensing the "DOWN" position of the tone arm is operated so as to be thrown toward the NO contact NO. That contact NO is connected to a FLIP-FLOP circuit FF7 formed of NOR gates NOR516 and NOR517. The NO contact of the microswitch S506 now connected to ground triggers the output pin 3 of the FLIP-FLOP circuit FF7 to its "L" value. A signal having this "L" value is differentiated by a capacitor C508 and resistors R522 and 523 and then applied to another input pin 1 of the FLIP-FLOP circuit FF8 to trigger it resulting in an output "H" appearing at its output pin 6. Therefore the motor M402 is stopped and the tone arm is caused to play gramophone disc on the turntable.

Next, it is assumed that the "REPEAT" knob is depressed while the tone arm is in its playing status. (It is noted that the "REPEAT" knob can be depressed at any time. The depression of that knob causes a FLIP-FLOP circuit FF3 including "NOR" gates NOR505 and NOR506 and connected to the "REPEAT" microswitch S502 to be triggered once resulting in a signal "L" appearing at its output pin 11. This signal triggers the next succeeding T type FLIP-FLOP circuit FF4 including NOR gates NOR507 and NOR508 from an "H" to an "L" value at an output pin 3 thereof. The FLIP-FLOP circuit FF4 has the output pin 3 put at the "H" value due to the application of a power reset signal thereto through a semiconductor diode 503. A signal with this "L" value from the output pin 3 is connected to one input pin 10 of the "NOR" gate NOR509 to impart an "H" value to an output pin 8 thereof. Then a signal having this "H" value is delivered to the transistor Q110 (see FIG. 9) to fire the light emitting diode D121 for "LEAD-IN" connected thereto as above described.

Also the FLIP-FLOP circuit FF4 includes an output pin 6 at which a signal "H" opposite to the signal at the output pin 3 thereof appears. This signal is applied via a terminal E25 to a terminal B5 shown in FIG. 12 and then to a transistor Q403 through a resistor R406 to turn it on. This results in the light emitting diode D403 (see 73, FIG. 6) emitting light to indicate that the system can repeatedly play the particular gramophone disc.

In the foregoing it is noted that the light emitting diode for "LEAD-IN" is fired only when the FLIP-FLOP circuit FF9 is triggered to provide an output "L" at the output pin 6 thereof without the system being in its repeating state. That is, that diodes emits light only when the tone arm is being horizontally turned toward the center of the particular gramophone disc. However with the system maintained in its repeating state, the diode for "LEAD-IN" continues to emit light thinking that no gramophone disc is on the turntable. In this case, it is possible to bring the tone arm into its "LEAD-IN" position during the turning movement of the tone arm either toward the center of a gramophone disc or the outer periphery thereof. Thus whether or not the tone arm can be put in its "LEAD-IN" position is determined by whether or not that light emitting diode is fired.

The tone arm continues to perform the playing operation and completes it in due course, whereupon it reaches its "LEAD-OUT" position. This causes the actuation of the circuit for sensing the "LEAD-OUT" position resulting in the appearance of a signal "H" at a terminal E14 shown in FIG. 10. This signal is delivered to input pins 12 and 9 respectively of "NAND" gates NA512 and NA513 and passed through either one thereof as the case may be.

The "NAND" gate NA512 includes an input pin 13 connected to one output pin 11 of a FLIP-FLOP circuit FF6 indicating whether or not the tone arm is in its up position. Since the tone arm is now in its "DOWN" position that output pin 11 has an "H" value. Also the "NAND" gate NA513 includes an input pin 10 connected to the other output pin 8 of the FLIP-FLOP circuit FF6. The output pin 8 has an "L" value as opposed to the value at the output pin 11. Therefore the signal "H" as above described passes through the "NAND" gate NA512 resulting in the appearance of a signal "L" at its output pin 11. This signal "L" enters the input pin 10 of the FLIP-FLOP circuit FF8 to put its output pin 6 at an "L" value to drive the vertical drive motor M402 to move the tone arm upwardly. Upon the tone arm ascending to a predetermined level, a microswitch S506 for sensing the "UP" position is actuated to develop a signal "L" at the output pin 11 of the FLIP-FLOP circuit FF6. The signal "L" is differentiated, inverted and applied as a positive trigger signal to both the NAND gates NA508 and NA514 as above described. However, since the tone arm is now in a other then its position "REST", position the positive trigger signal passes through the "NAND" gate NA514 to produce a negative trigger signal at its output pin 6. This negative trigger signal is delivered to an input pin 13 of a FLIP-FLOP circuit FF10 formed of "NOR" gates NOR522 and NOR523 to trigger its output pin 8 to an "H" value. The output pin 8 was preliminarily set at an "L" value by the power reset signal. A signal having this "H" value is applied via a terminal E31 and a terminal B4 (see FIG. 12) to a resistor R418 shown in FIG. 12. This causes the motor M401 to be rotated in a direction opposite to that described in conjunction with the turning movement of the tone arm toward the inner periphery of the disc. Simultaneously the motor M402 is stopped by the triggering of the FLIP-FLOP circuit F8 as above described.

In this way the tone arm ascends after the sensing of the "LEAD-OUT" position and then it is horizontally turned toward the outer periphery of the particular gramophone disc after the sensing of the "UP" position. As above described, the system is in its repeating state. Therefore when the tone arm reaches the vicinity of the outer periphery of the disc, the "LEAD-IN" position is sensed whereupon the tone arm stops its horizontal turning movement and begins a descending movement. After its "Down" position has been sensed, the tone arm again carries out the playing operation.

During the particular playing operation, the "STOP" knob can be depressed to return the tone arm to its "REST" position. By depressing the "STOP" knob, the microswitch S504 (see 67, FIG. 6A) is operated to connect one end of a resistor R15 to ground thereby to form a signal "L". This signal "L" is differentiated by a capacitor C506 and resistors R514, R515 and inverted to a positive trigger signal by an inverter IV502. The positive trigger signal is applied to both "NAND" gates NA506 and NA507 while at the same time it resets the FLIP-FLOP circuit FF4 through a semiconductor diode D504. Therefore the system is released from the repeating state. The "NAND" gate NA506 includes an input pin 9 connected to the output pin 8 of the FLIP-FLOP circuit FF6, and that output pin 8 is maintained at an "L" value because the tone arm is at its "DOWN" position. This means that the positive trigger signal as above described can not pass through the "NAND" gate NA506. On the other hand, the "NAND" gate NA507 includes an input pin 4 connected to the output pin 6 of the inverter IV505 adapted to be maintained at an "H" value unless the tone arm is at its "REST" position. The "NAND" gate NA507 also includes another input pin 3 connected to the output pin 11 of the FLIP-FLOP circuit FF6. As above described, this FLIP-FLOP circuit FF6 has an output pin 8 having an "L" value and therefore the output pin 11 thereof has an "H" value. Therefore the positive trigger signal as above described passes through the "NAND" gate NA507 to provide a negative trigger signal at its output pin 6. This negative trigger signal is applied to the input pin 13 of the FLIP-FLOP circuit FF8 to rotate the motor M402 thereby to raise the tone arm. Then the "UP" position is sensed and the tone arm is horizontally turned toward its "REST" position. Upon the "REST" position being reached, the circuit for sensing the "REST" position is actuated resulting in the appearance of a signal "L" at the terminal E15. This signal "L" is passed through the inverters IV504 and IV505 and differentiated by a capacitor C510 and resistors R526, R527. Then it triggers the FLIP-FLOP circuit FF11 to stop the rotational movement of the turntable.

This negative trigger signal also triggers the "FLIP-FLOP" circuit FF10 to stop the horizontal drive motor M401. The negative signal further resets the FLIP-FLOP circuit FF2 for controlling the rotational speed of the turntable and also is connected to a NOR gate NOR518 to produce a positive trigger signal at its output pin 3. This positive trigger signal is connected to a "NAND" gate NA509. If the "NAND" gate NA509 has an input pin 5 put at an "H" value, then the signal passes through the gate NA509 to trigger the FLIP-FLOP FF8 thereby to move the tone arm downwardly.

As the "NAND" gate NA509 has the input pin 5 connected to the output pin 8 of the "FLIP-FLOP" circuit FF6, the signal passes through the "NAND" gate NA509 when the tone arm has been returned to its "REST" position while it is kept raised. However if the tone arm in the playing state or at its "DOWN" position is manually returned ot its "REST" position, then the signal is blocked by the "NAND" gate NA509 with the result that the motor for moving the tone arm downwardly is not rotated. (This is because there is no necessity of doing so.)

Even when no gramophone disc is present on the turntable, the "start" knob can be depressed. This depression of the "START" knob causes the initiation of the rotation of the turntable and also the initiation of the rise of the tone arm. Then the "UP" position is sensed and the tone arm is horizontally turned. Under these circumstances, the size sensor circuit has sensed the absence of a gramophone disc and the light emitting diode for "LEAD-IN" is not fired. Thus the tone arm travels past its "LEAD-IN" position and continues to be turned toward the center of the turntable until it reaches its "LEAD-OUT" position. As a result, the circuit for sensing the "LEAD-OUT" position is actuated to develop a signal "H" at the terminal E14. This signal "H" is applied to the NAND gates NA512 and NA513.

As above described, the "NAND" gates NA512 and NA513 operate differently when the tone arm is in its "UP" position than when it is in a position other than the "UP" position. In this case, the tone arm is maintained in its "UP" position and the "FLIP-FLOP" circuit FF6 has an "H" value at its output pin 8. This results in the passage of the signal through the "NAND" gate NA513. Then the signal is delivered to the FLIP-FLOP circuits FF9 and FF10. As a result, the FLIP-FLOP circuit FF9 is triggered to stop the horizontal movement of the tone arm toward the center of the turntable. Then the FLIP-FLOP circuit FF10 is triggered to horizontally turn the tone arm toward the outer periphery of the turntable. Thereafter the "REST" position is sensed and the tone arm reaches its "DOWN" position as above described.

It may be desired to lower the tone arm on the particular gramophone disc at same desired arbitrary position. For this purposes, the "START" knob can continue to be depressed until the tone arm reaches a position above the desired position on the disc. At that time the "START" knob is released. This measure is different from the above-described action of depressing the knob "START" immediately followed by its release.

By depressing the "START", knob the turntable is rotated and the size of the particular gramophone disc is sensed while movement of the tone arm is changed from an ascending movement to a horizontally turning movement toward the center of the disc as above described. At this stage, the light emitting diode for "LEAD-IN" is fired. When the tone arm passes above the fired diode, the circuit for sensing the "LEAD-IN" position is actuated to develop a signal "L" at the terminal E13. The signal "L" passes through the "NOR" gate NOR521 to form a signal "H" at its output. While this signal "H" tends to enter the "NAND" gate NA511 the FLIP-FLOP circuit FF5 remains triggered due to the "START" knob being maintained in its depressed position. Thus the FLIP-FLOP FF5 has an "L" value at its output pin 8. As that output pin 8 is connected to the input pin 13 of the "NAND" gate NA511, the "LEAD-IN" signal is not permitted to pass through the "NAND" gate NA511. Therefore the tone arm is not lowered onto the disc.

When the "START" knob is then released, the output pin 8 of the FLIP-FLOP circuit FF5 is inverted from its "L" to its "H" value. The inverted signal is connected to the "NAND" gates NA511 and NA510. The "NAND" gate NA510 has the pin 12 connected via the terminal E22 to the terminal A14 shown in FIG. 9 and also to the output pin 11 of the inverter IV101. Since a gramophone disc is present on the turntable, that output pin 11 has an "H" value as seen in FIG. 8B. Therefore the output pin 11 of the "NAND" gate NA510 has an "L" value. A signal with this "L" value is differentiated by a capacitor C509, and resistors R524, R525 and then entered into the "NOR" gate NOR521. The signal as a positive trigger signal leaves the "NOR" gate NOR521 and enters the "NAND" gate NA511 including an input pin 2 connected to the FLIP-FLOP circuit FF6. Since the tone arm is at its "up" position, the FLIP-FLOP circuit FF6 has an "H" value at its output pin 8. As a result, the positive trigger signal as above described passes through the "NAND" gate NA511 whereby the tone arm moves to the playing state through a process similar to the ordinary LEAD-IN process as above described.

Thus it is seen that the present invention provides an automatically operated record player system which is simple in operation and characterized in that the size of a gramophone disc placed on the turntable and various positions and statuses of a tone arm can be sensed in a contact-less manner to prevent the deterioration of the performance thereof.

While the present invention has been illustrated and described in conjunction with a single preferred embodiment thereof it is to be understood that numerous changes and modifications in the details of the mechanical construction and circuit configuration may be resorted to without departing from the spirit and scope of the present invention.

What is claimed is:

1. An automatically operated record player system comprising a turntable for supporting different size gramophone discs thereon and having turntable driving means, a tone arm means movable horizontally across said turntable and movable up and down into and out of contact with a disc on said turntable for picking up the contents recorded on the disc, a light directing means adjacent said turntable for directing light toward the disc supporting surface of said turntable, reflecting means on said turntable selectively covered by a graphone disc placed on the turntable depending on the diameter of said gramophone disc a plurality of light receiving elements adjacent said turntable selectively receiving light from said reflecting means in accordance with the outside diameter of a gramophone disc which is placed on the turntable and for intermittently producing a pulsed signal, charging and discharging circuit means including a capacitor and a resistor coupled to said light receiving elements for receiving said pulsed signal and for converting it to a saw-toothed waveform, electronic circuit means connected to said charging and discharging circuit means for determining whether or not said saw-toothed waveform exceeds a predetermined threshold magnitude, logic circuit means connected to said electronic circuit means and responsive to the result of the determination effected by said electronic circuit means for sensing both whether or not a gramophone disc is present on said turntable and the outside diameter of the gramophone disc, and electronic control circuit means connected to said logic circuit means and responsive to the sensed outside diameter of said gramophone disc and having an output connected to said turntable driving means for setting a rotational speed of said turntable at a predetermined magnitude in accordance with the sensed outside diameter of the gramophone disc.

2. An automatically operated record player system as claimed in claim 1 in which said light directing means comprises a plurality of light sources disposed laterally of and to one side of said turntable, a first light reflector positioned outside the periphery of said turntable for reflect light beams from said light sources to irradiate an exposed surface of said turntable with the reflected light beams, said turntable having a plurality of holes extending therethrough at positions predetermined according to the outside diameters of gramophone discs to be placed on said turntable, a plurality of second light reflectors in the respective holes and directing the light from said first light reflector to below said turntable, and said plurality of light receiving elements being located for causing, during the rotational movement of said turntable with a gramophone disc therein, said light receiving elements to selectively and intermittently receive light reflected through said holes for producing said pulsed signals.

3. An automatically operated record player system as claimed in claim 1 in which said tone arm is movable horizontally over said turntable between "LEAD-IN" positions at which said tone arm moves down onto the gramohone disc and "LEAD-OUT" positions at which said tone arm is raised from said gramophone disc, the respective "LEAD-IN" and "LEAD-OUT" positions corresponding to different size discs, a plurality of "LEAD-IN" light sources for indicating the "LEAD-IN" positions, a plurality of "LEAD-OUT" light sources for indicating the "LEAD-OUT" positions, a "LEAD-IN" and "LEAD-OUT" sensing means on said tone arm for sensing light from said "LEAD-IN" and "LEAD-OUT" light sources, tone arm raising and lowering means connected to said sensing means for raising and lowering the tone arm in response to the sensed "LEAD-IN" and "LEAD-OUT" positions, and control means connected to said logic means and to said "LEAD-IN" and "LEAD-OUT" light sources and responsive to said sensed outside diameter of said gramophone disc for selectively energizing said "LEAD-IN" and "LEAD-OUT" light sources corresponding to the "LEAD-IN" and "LEAD-OUT" positions for the size of gramophone disc on the turntable.

4. An automatically operated record player as claimed in claim 3 in which the tone arm is movable to a "REST" position outside the periphery of the turntable, and further comprising a photocoupler at said "REST" position disposed so that the optical path thereof is interrupted by said sensor arm when said tone arm comes to said "REST" position, said photocoupler being connected to said tone arm raising and lowering means for lowering said tone arm at the "REST" position when the optical path is interrupted.

5. An automatically operated record player system as claimed in claim 3 in which said sensing means comprises a sensor arm coupled with and turned integrally with said tone arm about a common axis of rotation, a light receiving element for the "LEAD-IN" position on said sensor arm at a position for receiving light from said "LEAD-IN" light sources during the turning movement of said sensor arm and said tone arm, a light receiving element for the "LEAD-OUT" position on said sensor arm at a position for receiving light from said "LEAD-IN" light sources during the turning movement of said sensor and tone arms.

6. An automatically operated record player system as claimed in claim 5 wherein said control means comprises means for normally energizing the "LEAD-IN" light source only when said tone arm is being moved toward the center of said turntable, and said record player system further comprises a "REPEAT" knob for causing repeated play of a gramophone disc, and means in said control means responsive to actuation of said "REPEAT" knob for maintaining energization of said "LEAD-IN" light source during the turning movement of said tone arm toward the outer periphery of said turntable, whereby the gramophone disc can be played repeatedly without said tone arm being returned past the "LEAD-IN" position.

7. An automatically operated record player system as claimed in claim 5 wherein said tone arm means comprises an electric motor for horizontally driving said tone arm, a start means electrically connected to said motor for starting said motor for driving said electric motor for moving said tone arm toward the center of said turntable, and means responsive to a continuous signal from said start means and connected to said motor for driving said electric motor and cause said tone arm to continue to be turned toward the center of said turntable independently of the sensing of said "LEAD-IN" position without said tone arm being stopped until said continuous signal is discontinued, said lastmentioned means being connected to said tone arm raising and lowering means for causing said tone arm to be lowered at the position on said gramophone disc at which the tone arm is located when said continuous signal is discontinued.

8. An automatically operated record player system comprising in combination, a tone arm, means for mounting said tome arm for horizontal and vertical movement a first electric motor for vertically driving said tone arm, a second electric motor for horizontally driving said tone arm, control means connected to said motors for controlling the vertical movement of said tone arm through the rotational movement of said first electric motor and for selectively driving said second electric motor, means for sensing positions at which ascent and descent of said tone arm is to take place and connected to said control means, and rotational force transmitting means for transmitting the rotational force from said second electric motor to said tone arm for horizontally driving said tone arm while it is maintained in the raised position and means being responsive to the initiation of descent of said tone arm by said first electric motor for thereafter preventing the rotational force from said second electric motor from being transmitted to said tone arm, whereby the application of any unnecessary horizontal driving force to said tone arm during the playing operation is avoided.

9. An automatically operated record player system comprising, in combination, a tone arm, means for mounting said tome arm for horizontal and vertical movement a first electric motor for vertically driving said tone arm, a second electric motor for horizontally driving said tone arm, a cam plate including a first cam portion having an upper sloping surface, and a second and a third cam portion eccentric to the axis thereof, said cam plate being connected to said first electric motor for rotation thereby, a shaft and a shaft lifter contacting said first cam portion for being vertically moved thereby, means for sensing positions of ascent and descent of said tone arm and driven by said second cam portion, a lever engaging said third cam portion and moved thereby, a further lever coupled to said firstmentioned lever, an idle roller mounted on one of said levers and rotated by said second electric motor, a pulley connected to said tone arm and rotated integrally with said tone arm, and means for contacting said idle roller with said pulley for transmitting a rotational force from said second electric motor to said tone arm to horizontally drive it when said tone arm is in the raised position, said lastmentioned means being responsive to the initiation of descent of said tone arm for disengaging said idle roller from said pulley thereby to prevent the application of any unnecessary horizontal driving force to said tone arm during the playing operation.

* * * * *